(12) United States Patent
Kim et al.

(10) Patent No.: US 7,313,330 B2
(45) Date of Patent: Dec. 25, 2007

(54) REDUNDANT APPARATUS AND METHOD FOR GIGABIT ETHERNET PASSIVE OPTICAL NETWORK SYSTEM AND FRAME FORMAT THEREOF

(75) Inventors: Su-Hyung Kim, Seoul (KR); Se-Youn Lim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 685 days.

(21) Appl. No.: 10/625,094

(22) Filed: Jul. 22, 2003

(65) Prior Publication Data

US 2004/0033077 A1    Feb. 19, 2004

(30) Foreign Application Priority Data

Aug. 13, 2002  (KR) .................. 10-2002-0047949

(51) Int. Cl.
*H04J 14/00* (2006.01)
(52) U.S. Cl. .................. 398/72; 398/19; 398/45
(58) Field of Classification Search .............. 398/58, 398/145, 5, 72, 19, 45, 46, 63; 370/241.1, 370/244, 466, 236.2
See application file for complete search history.

(56) References Cited

U.S. PATENT DOCUMENTS

| | | | | |
|---|---|---|---|---|
| 5,946,313 A * | 8/1999 | Allan et al. | .................. | 370/397 |
| 6,160,820 A * | 12/2000 | Isaksson et al. | ............. | 370/480 |
| 7,177,325 B2 * | 2/2007 | Claseman | .................. | 370/469 |
| 2002/0030865 A1 * | 3/2002 | Kawate et al. | ............. | 359/110 |
| 2002/0071149 A1 * | 6/2002 | Xu et al. | ..................... | 359/110 |
| 2002/0191250 A1 * | 12/2002 | Graves et al. | ............. | 359/128 |
| 2004/0085895 A1 * | 5/2004 | Zettinger et al. | ........... | 370/220 |

FOREIGN PATENT DOCUMENTS

| | | |
|---|---|---|
| JP | 60-190044 | 9/1985 |
| JP | 03-259636 | 11/1991 |
| JP | 08-510103 | 10/1996 |
| JP | 09-098181 | 4/1997 |
| JP | 10-126432 | 5/1998 |
| JP | 10-262000 | 9/1998 |
| JP | 11-027181 | 1/1999 |
| JP | 11-122172 | 4/1999 |
| JP | 2000-31269 | 11/2000 |
| JP | 2001-119345 | 4/2001 |
| JP | 2001-326620 | 11/2001 |
| JP | 2002-009805 | 1/2002 |
| JP | 2002-057679 | 2/2002 |
| JP | 2002-152135 | 5/2002 |
| JP | 2002-164907 | 6/2002 |
| JP | 2002-218008 | 8/2002 |

* cited by examiner

*Primary Examiner*—Dzung Tran
(74) *Attorney, Agent, or Firm*—Cha & Reiter, LLC

(57) ABSTRACT

A GE-PON (Gigabit Ethernet Passive Optical Network) apparatus includes a 2×N splitter, an OLT (Optical Line Terminal) connected to the 2×N splitter via a first path line or a second path line, and a switching unit for switching the first path line or the second path line upon receiving a predetermined control signal. An ONU (Optical Network Unit) generates a switching request according to a signal environment and transmits the generated switching request to the OLT.

18 Claims, 6 Drawing Sheets

| DA | SA | LENGTH /TYPE | SUBTYPE | VER | FLAG | OPCODE | DATA /PAD | FCS |

REDUNDANT APPARATUS AND METHOD FOR GIGABIT ETHERNET PASSIVE OPTICAL NETWORK SYSTEM AND FRAME FORMAT THEREOF

CLAIM OF PRIORITY

This application claims priority to an application entitled "GIGABIT ETHERNET PASSIVE OPTICAL NETWORK AND METHOD FOR SWITCHING PATHES BETWEEN OLT AND SPLITTER AND FRAME STRUCTURE THEREOF," filed in the Korean Intellectual Property Office on Aug. 13, 2002 and assigned Ser. No. 2002-47949, the contents of which are hereby incorporated by reference.

BACKGROUND OF THE INVENTION

1. Field of the Invention

The present invention relates to a GE-PON (Gigabit Ethernet—Passive Optical Network) system, and more particularly to a redundant apparatus and method for switching a path between an OLT (Optical Line Terminal) and a splitter, and a frame format thereof

2. Description of the Related Art

Typically, a PON system has a Point-To-Multipoint structure where one central node (i.e., one OLT) is connected to a plurality of regional nodes (i.e., a plurality of optical network units (ONUs)) by means of a passive optical splitter on an optical cable.

FIG. 1 is a block diagram illustrating an overall configuration of a conventional GEP-PON system. A 1×N passive optical splitter connects one OLT to a N ONUs in a tree-structured distribution topology.

FIG. 2 illustrates a format of a legacy OAM (Operation, Administration and Maintenance) frame. "DA" is a destination address and "SA" is a source address. The remaining fields are reference characters. In particular, "SUBTYPE" contains a prescribed value of 0×03 (i.e., the hexadecimal digits "0" and "3"). "VER" indicates version information, "FLAG" indicates flag information, and "OPCODE" indicates an operation code. "FCS" is an abbreviation of a Frame Check Sum. The field lengths, in octets (8 bits), for the nine fields shown in FIG. 2 are six, six, two, one, one, one, one, 106 and four, respectively.

An automatic switching system prescribed in an ITU-T G.783 performs a switching function using K1 and K2 bytes of a SDH (Synchronous Digital Hierarchy).

Presently, ITU-T G.983.5 completes a standardization of an enhanced survivability, broadband optical network and uses an additional standardization frame. However, the additional frame such as a PLOAM (Physical Layer Operation, Administration and Maintenance) having respective individual fields of K1 and K2 bytes to enhance survivability of the broadband optical network is implemented with a difference between an upstream format and a downstream format.

The ITU-T G.983.5, moreover, is directed to an ATM-PON (Asynchronous Transfer Mode—Passive Optical Network) topology and frame format, whose frame transmission method and characteristics are incompatible with the emerging IEEE 802.3ah "Ethernet in the First Mile" (EFM) OAM switching scheme.

There are three kinds of switching methods between an OLT and a splitter, that is, an OLT-only protected system, a fully protect system for switching an overall area ranging from the OLT to an ONU, and an X:N switching system. However, an OAM track based on the IEEE 802.3ah EFM being currently standardized does not describe an improved scheme for implementing functions associated with a switching request.

SUMMARY OF THE INVENTION

The present invention addresses the above-described shortcomings in the prior art.

In one aspect, the present invention provides a redundant apparatus for a GE-PON system, which switches paths between an OLT and a 2×N splitter.

In another aspect of the present invention, a method is provided for controlling a switching function of paths between an OLT and a 2×N splitter in a GE-PON system, and a frame format is provided for controlling the switching function.

In accordance with the present invention, a GE-PON (Gigabit Ethernet Passive Optical Network) apparatus includes: a 2×N splitter; an OLT (Optical Line Terminal) connected to the 2×N splitter via a first path line or a second path line and having a switching unit for switching the first path line or the second path line upon receiving a predetermined control signal; and an ONU (Optical Network Unit) for creating a switching request according to a signal environment, and transmitting the generated switching request to the OLT.

BRIEF DESCRIPTION OF THE DRAWINGS

The above and other aspects, features and other advantages of the present invention will be more clearly understood from the following detailed description taken in conjunction with the accompanying drawings, in which the same or similar elements are annotated by the same reference numerals throughout the several views.

DETAILED DESCRIPTION OF THE PREFERRED EMBODIMENTS

Preferred embodiments of the present invention will he described in detail with reference to the annexed drawings. In the following description, unneeded detailed description of known functions and configurations incorporated herein will be omitted for clarity. Although a specific bit order and a specific bit number are exemplarily shown in the following description, those skilled in the art will appreciate that various modifications, additions and substitutions are possible, without departing from the scope and spirit of the invention.

The present invention performs either an automatic switching operation or a compulsory switching operation using a notification field for indicating asynchronous information contained in an OAM field for which standardization is in progress. The automatic switching operation is performed when receiving automatic switching requirements such as a signal degradation (SD), a signal failure (SF), a power margin, etc. The compulsory switching operation is performed by a user. A switching structure is configured to have a data flow based on an 1+1 non-recovery switching scheme, but a block switched by a prescribed command applies a switch block based on an 1:1 recovery switching scheme. The present invention informs an OLT of an event using an initially received ONU ID (Identifier), the OLT receiver receiving the ONU ID generates a switching command, and thus a switching function is performed using a switching block contained in an OLT and a 2×N splitter within a prescribed time of 50 ms. The present invention may insert necessary information in a data frame using a flag bit and an OP code that are adapted to transmit asynchronous information of a signaling OAM frame between a near end and a far end, and may transmit the data frame including the necessary information. By augmenting the OAM frame to be transmitted only with the flag bit and the OP code, the service halt time can be shortened, the service halt time being comprised of a detection time, a switching time, and a switching guard time in connection with the reading or writing of a data frame. Further time savings can be realized by using only the flag bit.

Upon receipt of a message informing it of an event requiring switching, the near end performs an automatic switching operation using a specific block functioning as a switch (e.g., a switch of 1:1 structure) before transmitting the received message associated with corresponding SD, SF, or power loss to an upper layer of a system. If the OLT located in the near end triggers SF and SD signals, a switching request is generated using a flag bit and an OP code that are defined in the OAM frame. This switching request is generated by a non-recovery switching scheme, such that operations accompanied with a command entry are needed to revert back to the original working path line as configured before such switching.

Figures 1, 2:
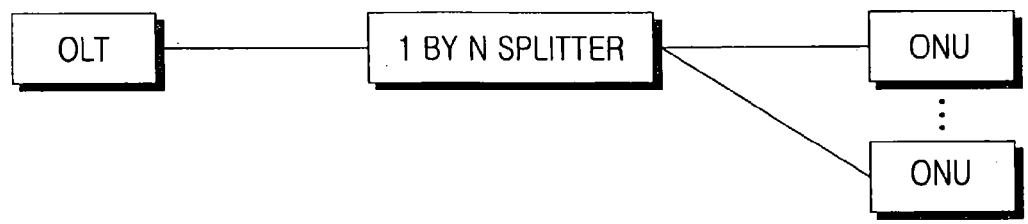
FIG. 1 depicts a configuration of a conventional GE-PON system.
FIG. 2 depicts a format of a conventional legacy OAM frame.
Figure 3:
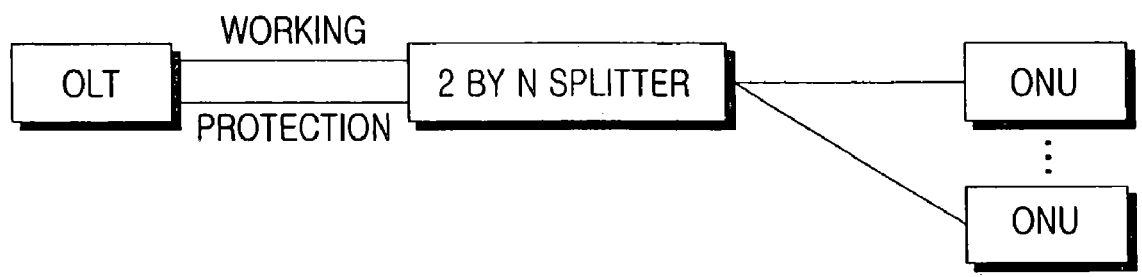
FIG. 3 depicts a configuration of a redundant apparatus for use in a GE-PON system in accordance with a preferred embodiment of the present invention.

FIG. 3 is a block diagram showing an example of a redundant apparatus for use in a GE-PON system in accordance with a preferred embodiment of the present invention. The redundant apparatus includes a 2×N splitter, rather than the 1×N splitter in FIG. 1, for performing a path switching control operation. An OLT is connected to the 2×N splitter via a bi-directional working path line composed of only one optical fiber and an additional, redundant path line also composed of a single optical fiber. N ONUs are connected to the 2×N splitter via individual optical fibers. Each ONU is configured to detect a transmission loss of the working path line upon receiving a signal transmitted from the OLT to that corresponding ONU, and transmits information for switching the working path line to another path line. The OLT receives the switching information via the working path line, and thereafter transmits data to the ONU via the redundant path line according to the received switching information.

Figure 4:
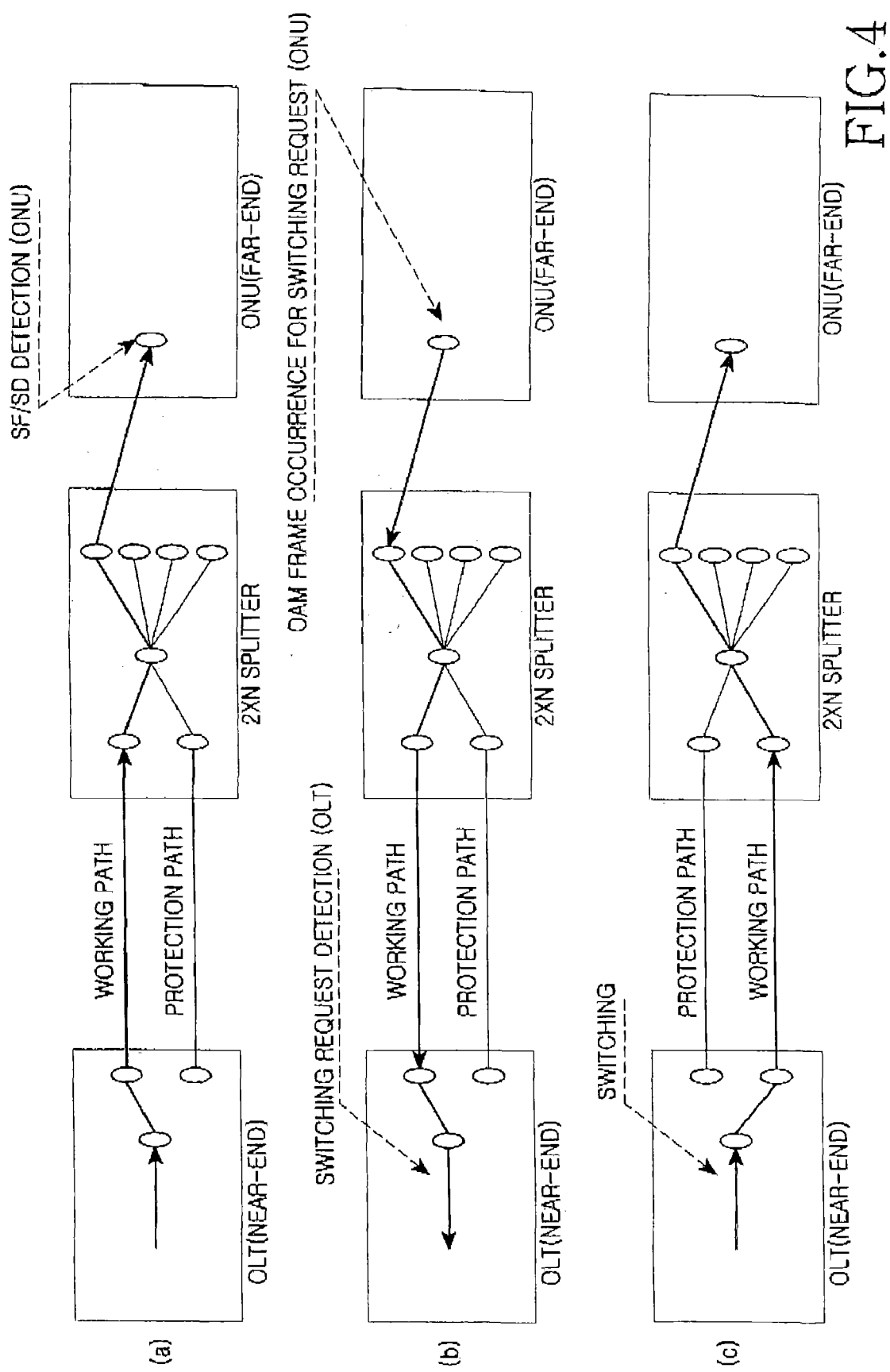
FIGS. 4a-4c illustrate switching procedures between an OLT and a 2×N splitter in a redundant apparatus for use in a GE-PON system in accordance with a preferred embodiment of the present invention.

FIGS. 4a-4c are flow diagrams illustrating, by way of example, switching procedures between a 2×N splitter in a redundant apparatus for use in a GE-PON system in accordance with a preferred embodiment of the present invention. FIG. 4a shows a downstream case where an ONU detects SF/SD information by checking signal environments. FIG. 4b shows an upstream case where an ONU generates an OAM frame for generating a switching request according to the checked result, a packet containing the OAM frame is transmitted to the OLT, and the OLT receives the packet to detect the switching request. FIG. 4c shows a downstream case where an OLT switches a current working path line to a protection path line upon receiving the switching request, and then swaps designations so that the protection path is now the current working path and so that the former working path is now the protection path.

Figure 5A:
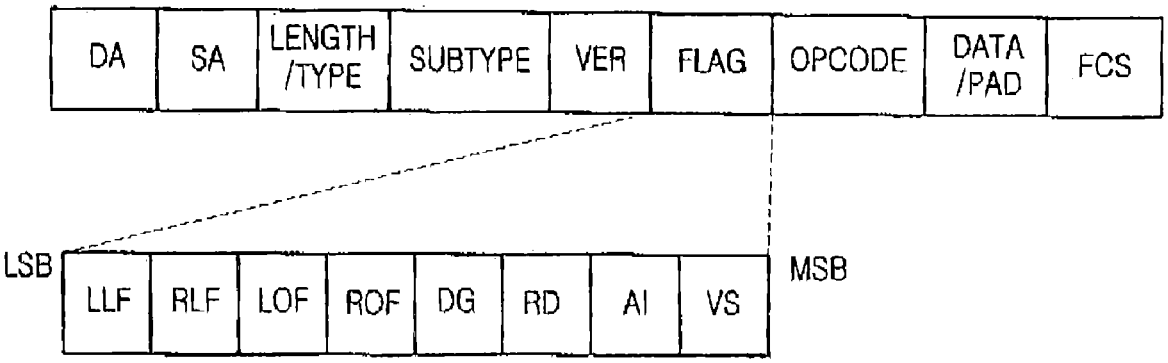
FIG. 5a illustrates a first format of an OAM frame in accordance with a preferred embodiment of the present invention.
Figure 5B:
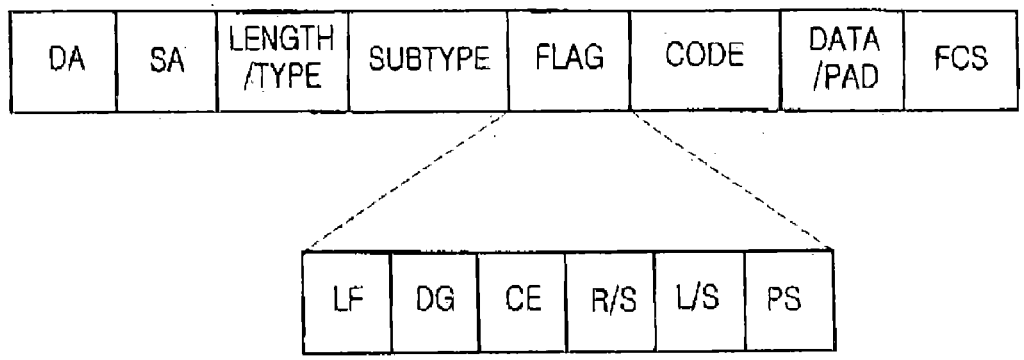
FIG. 5b illustrates a second format of an OAM frame in accordance with a preferred embodiment of the present invention.
Figure 5C:
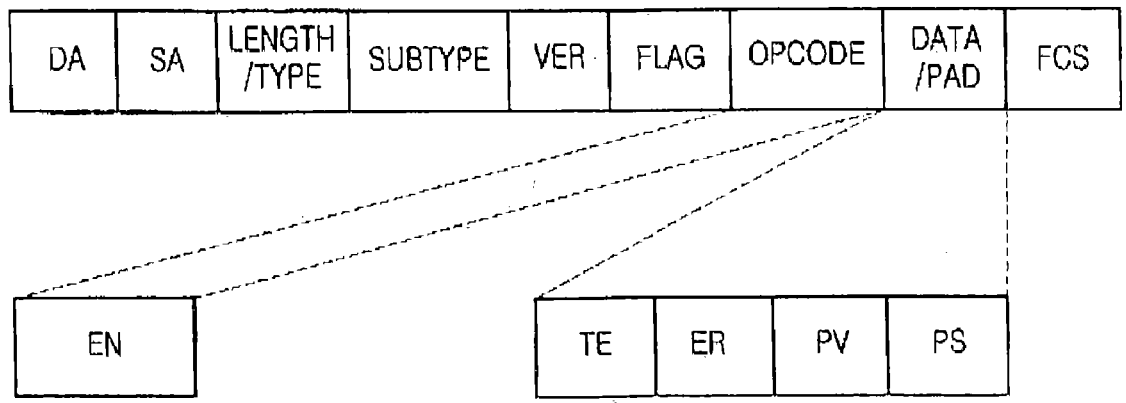
FIG. 5c illustrates a third format of an OAM frame including an operation field for an event indication and a data field containing a switching request in accordance with a preferred embodiment of the present invention.

FIGS. 5a-c depict exemplary formats illustrating OAM frames in accordance with a preferred embodiment of the present invention. A first format of the OAM frame, as shown in FIG. 5a, includes an alarm field to be used when detecting either a signal degradation or signal failure, and is implemented by an AI (Alarm Indication) bit corresponding to the seventh bit contained in the flag bits. The AI field is encoded as "1" when such an alarm condition is detected, so that alarm condition occurrence can be recognized by the OLT.

A second format of the OAM frame, as shown in FIG. 5b, includes a CE field generated when an undefined fault is detected, a R/S field generated when a local data terminal equipment (DTE) detected differs from expectation, an L/S field generated when a remote DTE detected differs from expectation, an LF (Link Fault) field generated when there is an error in a reception end, and a DG (Dying Gasp) field generated when there is a non-recovery error in the reception end.

A third format of the OAM frame, as shown in FIG. 5c, includes an operation field for performing event notification and a data field having a switching request. The operation field is indicated by a reference character "EN" and is composed of one octet that consists of the hexadecimal representation of the number 3 (i.e. 0×03). The data field includes, as detailed information for the OLT, a conventional temperature field "TE", an error rate "ER" field, a power/voltage "PV" field, and a protection switching field "PS". By using a variable container, some information to be transmitted can be further included in the data frame. The information is defined as a source ID, a line number, and so on.

Figure 6:
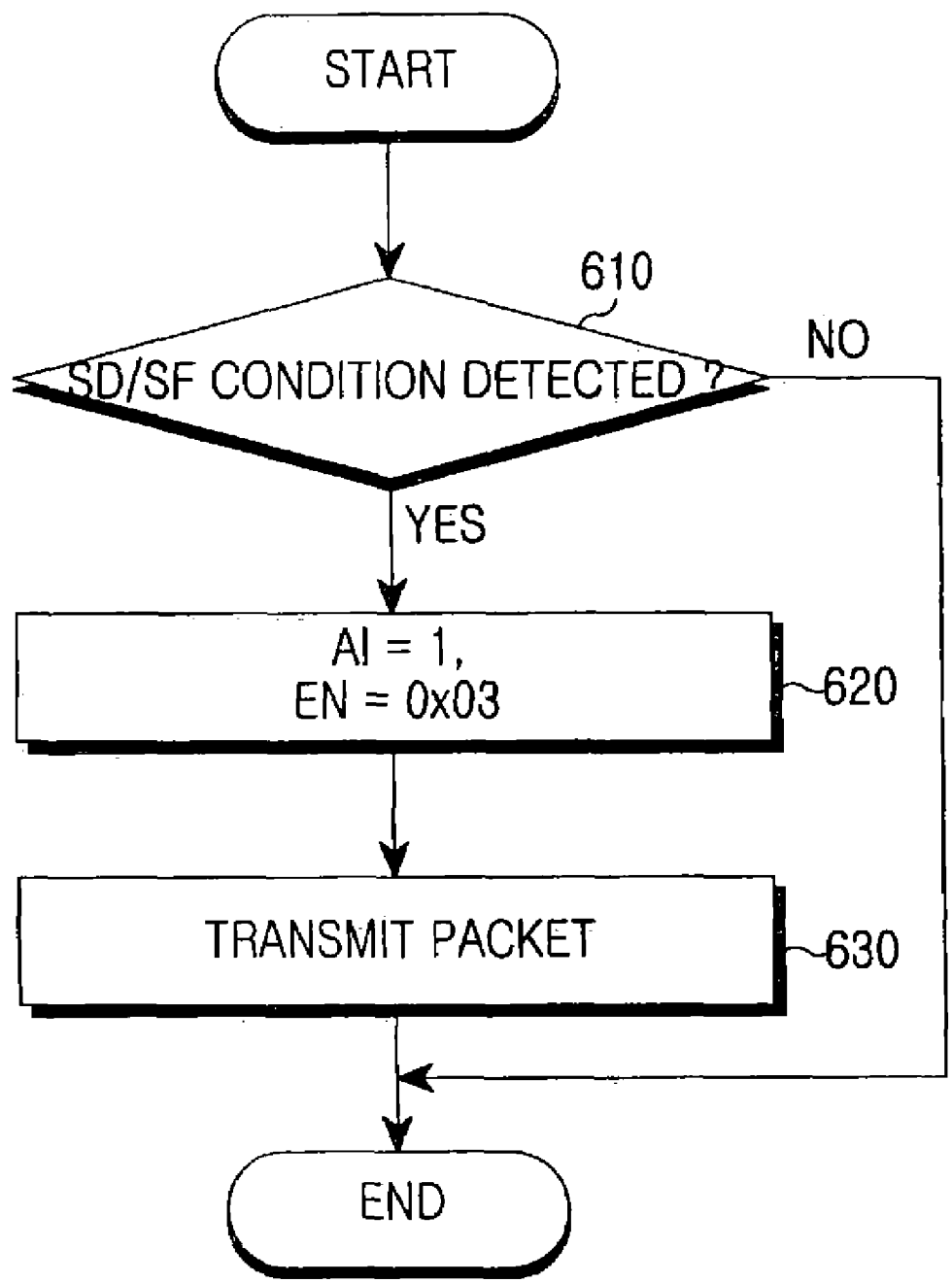
FIG. 6 illustrates a procedure for requesting a switching Operation of paths between an OLT and a 2×N splitter in an ONU (Optical Network Unit) for use in a GE-PON system in accordance with a preferred embodiment of the present invention.

FIG. 6 is a flow chart illustrating an exemplary procedure for requesting a switching operation of paths between an OLT and a 2×N splitter in an ONU (Optical Network Unit) for use in a GE-PON system in accordance with a preferred embodiment of the present invention. The ONU checks signal environments at step 610. If SD or SF information is detected at step 610, the ONU generates a switching request according to the checked result at step 620. Namely, the ONU sets "AI" to "1" at step 620 as shown in FIG. 5a. 0×03 is recorded in the EN field shown in FIG. 5b, and PS data is included in a data field. The ONU transmits a packet including the above information to the OLT at step 630.

Figure 7:
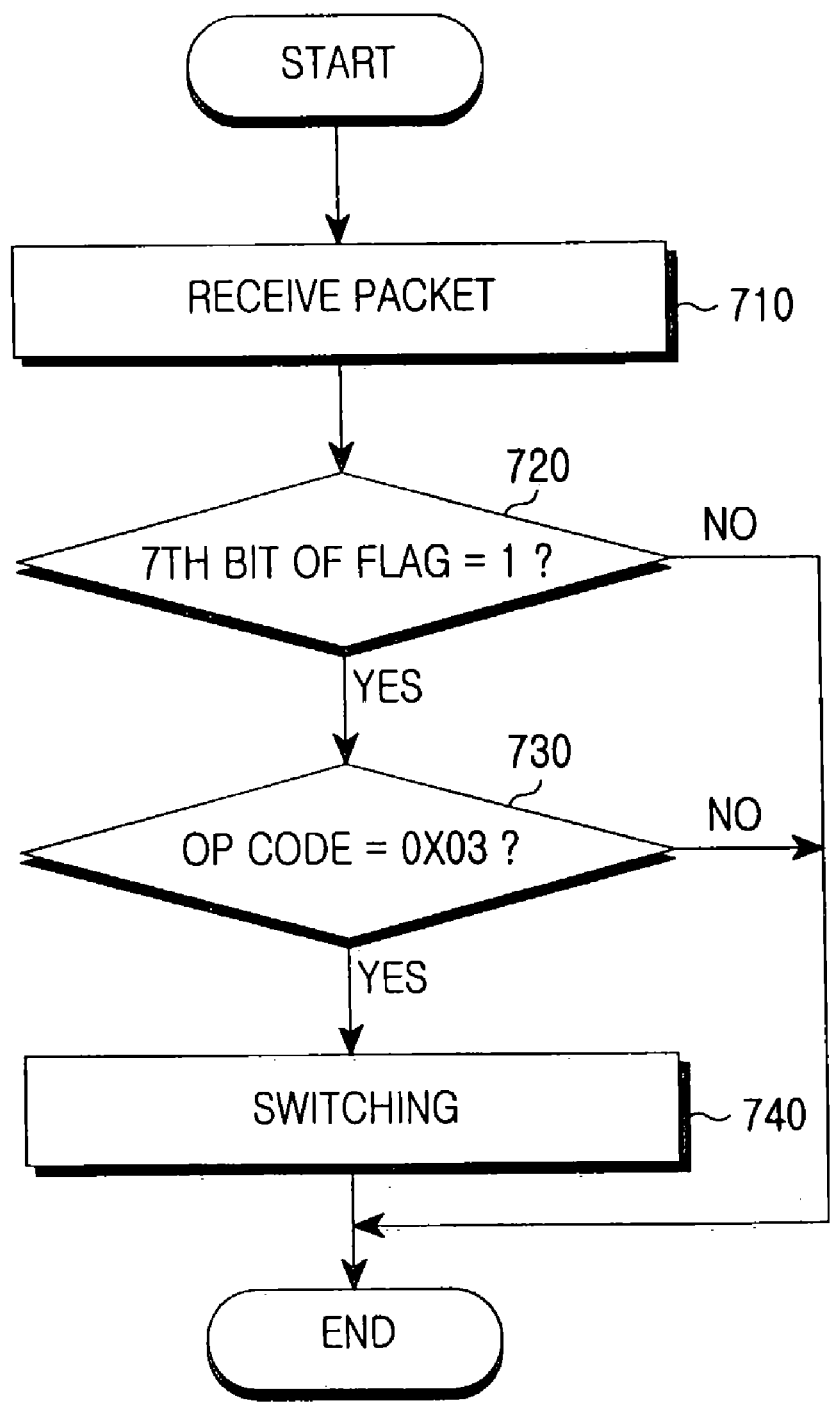
FIG. 7 illustrates a procedure for switching paths between an OLT and a 2×N splitter in a GE-PON system in accordance with a preferred embodiment of the present invention.

FIG. 7 is a flow chart illustrating an exemplary procedure for switching paths between an OLT and a 2×N splitter in a GE-PON system in accordance with a preferred embodiment of the present invention. The OLT receives the packet at step 710, and determines at step 720 whether the seventh field of the flag field of the received packet is "1". If it is determined that the seventh field of the flag field is "1", the OLT determines whether the OP code is "0×03" at step 730. If it is determined that the OP code is "0×03", the OLT recognizes that the received information is asynchronous information. The OLT detects a PS field at step 740, switches a current working path line to a protection path as shown in FIG. 4c, and then switches the protection path to the working path line.

As apparent from the above description, the present invention creates a redundant configuration between an OLT and a splitter functioning as a passive element adjacent to a subscriber area, resulting in system stability and the reduction of overall production cost. The inventive redundant switching method is indispensable in implementing an Ethernet optical line based on a gigabit backbone network and a subscriber unit, increasing the competitive value of the GE-PON system. Further, since the present invention features a switch block of a simple 1+1 configuration at low cost using a conventional splitter, and merely adds a switching function field to a frame format being currently standardized, the present invention contributes to system implementation and system standardization.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A redundant apparatus for a GE-PON (Gigabit Ethernet Passive Optical Network) system which includes an OLT (Optical Line Terminal), a splitter connected to the OLT via a working path line composed of only one optical fiber, and a plurality of ONUs (Optical Network Units) connected to the splitter via individual optical fibers, said apparatus comprising:
    said working path line located between the OLT and the splitter to perform two-way communication;
    a redundant pat line which is composed of only one optical fiber located between the OLT and the splitter to perform two-way communication;
    a switching block located in said OLT for performing either automatic or compulsory switching operation, said automatic switching operation by means of using a notification field for indicating asynchronous information contained in Ethernet OAM frame and said compulsory switching operation by means of manual manipulation by a user, said notification field in said Ethernet OAM frame receives switching information in a data frame using a flag bit adapted to transmit asynchronous information of said signaling Ethernet OAM frame between said OLT and said ONUs, and transmit the data frame including said asynchronous information, wherein said Ethernet OAM frame further includes:
    a CE field generated when an undefined fault is detected;
    a R/S field generated when a local data terminal equipment (STE) detected differs from expectation;
    a L/S field generated when a remote DTE detected differs from expectation;
    an LF (Link Fault) field generated when there is an error in a reception end; and
    a DG (Dying Gasp) field generated when there is a non-recovery error in the reception,
    ONU means for detecting a transmission loss of the working path line upon receiving a signal transmitted from the OLT to one ONU among the ONUs, and for transmitting switching information of the working path line via the working path line; and
    an OLT for receiving the switching information via the working path line, and for transmitting data to the ONU means via the redundant path line according to the received switching information.

2. The apparatus of claim 1, wherein said working and redundant path lines are disposed in a 1×1 configuration.

3. The notification field in claim 2, wherein an alarm field is provided for detecting either a signal degradation or signal failure and is implemented by an Alarm Indication (AI) bit corresponding to the $n^{th}$ bit contained in the flag bit.

4. The Alarm Indication (AI) bit in claim 3, wherein said alarm indication bit is encoded as a "1" when an alarm condition is detected, so that the alarm condition occurrence can be recognized by the OLT.

5. The apparatus of claim 1, wherein the splitter is a 2×N splitter and a switching function is performed using the switching and the splitter within a prescribed time of 50 ms.

6. The apparatus of claim 1, wherein said notification field in said Ethernet OAM receives switching information in a data frame using a flag bit and an OP code that are adapted to transmit asynchronous information of said signaling OAM frame between said OLT and said ONUs, and transmits the data frame including said asynchronous information.

7. An GE-PON (Gigabit Ethernet Passive Optical Network) apparatus, comprising:
    a 2×N splitter;
    an OLT (Optical Line Terminal) being connected to the 2×N splitter via a first path line or a second path line, and including a switching unit for switching the first path line or the second path line upon receiving a predetermined control signal, wherein said switching unit configured for using a notification field for indicating asynchronous information contained in an Ethernet OAM frame, said notification field in said Ethernet OAM frame receives switching information in a data frame using a flag bit adapted to transmit asynchronous information of said signaling Ethernet OAM frame between said OLT and said ONUs, and transmit the data frame including said asynchronous information, wherein said Ethernet OAM frame further includes;
    a CE field generated when an undefined fault is detected;
    a R/S field generated when a local data terminal equipment (STE) detected differs from expectation;
    a L/S field generated when a remote DTE detected differs from expectation;
    an LE (Link Fault) field generated when there is an error in a reception end; and
    a DG (Dying Gasp) field generated when there is a non-recovery error in the reception, and
    an ONU (Optical Network Unit) for creating a switching request according to a signal environment and transmitting the generated switching request to the OLT.

8. The apparatus as set forth in claim 7, wherein either one of the first path line and the second path line of the 2×N splitter is connected to the OLT and is adapted as a working path line, and the other one is not connected to the OLT and is adapted as a protection path line.

9. The apparatus as set forth in claim 8, wherein the splitter has a first input terminal and a second input terminal, and wherein the switching unit of the OLT disconnects the OLT from the splitter in switching the first input terminal to re-adapted the first input terminal from the working path line to the protection path line, or connects the OLT to the splitter in switching the second input terminal to re-adapt the second input terminal from the protection path line to the working path line.

10. The apparatus as set forth in claim 9, wherein the switching unit of the OLT disconnects the OLT from the splitter in switching the second path line having been adapted as the working path line to the protection path line, or connects the OLT to the splitter in switching the first path line having been adapted as the protection path line to the working path line.

11. The apparatus as set forth in claim 7, wherein said creating occurs in response to at least one of a signal degradation, a signal failure, and a power margin.

12. An Ethernet OAM (Operation, Administration and Maintenance) frame for a GE-PON (Gigabit Ethernet Passive Optical Network) system having two path lines located between a splitter and an OLT (Optical Line Terminal) in which only one path line is in a connection state to serve as a working path line, and the other one path line is in a no-connection state to serve as a protection path line, said Ethernet OAM frame comprising:
 a switching block located in said OLT for performing a switching operation, said switching operation by means of a operation field contained in the Ethernet OAM frame including;
 a notification field for indicating asynchronous information and;
 a data field having information generated by an ONU (Optical Network Unit) to request a switching operation between the working path line and the protection path line, wherein said notification field in said Ethernet OAM frame receives switching information in a data frame using a flag bit adapted to transmit asynchronous information of said signaling Ethernet OAM frame between said OLT and said ONUs, and transmit the data frame including said asynchronous information, said Ethernet OAM frame further includes;
 a CE field generated when an undefined fault is detected;
 a R/S field generated when a local data terminal equipment (STE) detected differs from expectation;
 a L/S field generated when a remote DTE detected differs from expectation;
 an LF (Link Fault) field generated when there is an error in a reception end; and
 a DG (Dying Gasp) field generated when there is a non-recovery error in the reception.

13. The OAM frame for GE-PON system as set forth in claim 12, further comprising a flag field having an N-th bit that is adapted to perform an alarm function, wherein the N-th bit indicates the existence of a predetermined condition for requesting the switching operation.

14. The OAM frame of claim 13, further comprising an operation (OP) code for event notification, the OP code including a predetermined value indicating asynchronous information.

15. The Ethernet OAM frame for GE-PON system as set forth in claim 12, wherein the data field includes;
 a temperature field (TE);
 a error rate field (ER);
 a power/voltage field (PV); and
 a protection switching field (PS).

16. The Ethernet OAM frame for GE-PON system as set forth in claim 12, wherein the operation field is indicated by reference character "EN" and is composed of one octet that consists of hexadecimal representation of a number.

17. A method for controlling a GE-PON (Gigabit Ethernet Passive Optical Network) system including:
 providing a 2×N splitter, providing an OLT_(Optical Line Terminal) being connected to the 2×N splitter via a first path line or a second path line and having a switching unit for switching the first path line or the second path line upon receiving a predetermined control signal; and providing an ONU (Optical Network Unit), said method comprising the steps of:
 a) providing a means for the ONU to check the signal environment;
 b) providing a means for the ONU to generate a switching request according to the checked result and transmitting a packet containing the switching request to the OLT;
 c) providing a means for the OLT to receive the packet and detecting the switching request; and
 d) providing a switching block located in the OLT for performing a switching operation upon receiving the switching request from an ONU to switch a current working path line to a protection path line and to switch a current protection path line to the working path line, whereas said automatic switching operation is by means of using a notification field for indicating asynchronous information contained in an Ethernet OAM frame, said notification field in said Ethernet OAM frame receives switching information in a data frame using a flag bit adapted to transmit asynchronous information of said signaling Ethernet OAM frame between said OLT and said ONUs, and transmit the data frame including said asynchronous information; wherein said Ethernet OAM frame further includes;
 a CE field generated when an undefined fault is detected;
 a R/S field generated when a local data terminal equipment (STE) detected differs from expectation;
 a L/S field generated when a remote DTE detected differs from expectation;
 an LF (Link Fault) field generated when there is an error in a reception end; and
 a DG (Dying Gasp) field generated when there is a non-recovery error in the reception.

18. The method of claim 17, wherein said notification field in said Ethernet OAM frame receives switching information in a data frame using a flag bit and an OP code that are adapted to transmit asynchronous information of said signaling OAM frame between said OLT and said ONUs, and transmits the data frame including said asynchronous information.

* * * * *